United States Patent
Chung et al.

(10) Patent No.: US 10,673,975 B2
(45) Date of Patent: Jun. 2, 2020

(54) CONTENT STREAMING SERVICE METHOD FOR REDUCING COMMUNICATION COST AND SYSTEM THEREFOR

(71) Applicant: LINE Corporation, Shibuya-ku, Tokyo (JP)

(72) Inventors: Sang Min Chung, Seongnam-si (KR); DaeWon Ryu, Seongnam-si (KR); JeeHong Lee, Seongnam-si (KR); Cheol-Won Oh, Seongnam-si (KR); Eunjin Joo, Seongnam-si (KR)

(73) Assignee: LINE Corporation, Tokyo (JP)

( * ) Notice: Subject to any disclaimer, the term of this patent is extended or adjusted under 35 U.S.C. 154(b) by 779 days.

(21) Appl. No.: 15/190,467

(22) Filed: Jun. 23, 2016

(65) Prior Publication Data
US 2017/0013034 A1 Jan. 12, 2017

(30) Foreign Application Priority Data
Jul. 9, 2015 (KR) .................. 10-2015-0097945

(51) Int. Cl.
*H04L 29/06* (2006.01)
*H04L 29/08* (2006.01)
(Continued)

(52) U.S. Cl.
CPC .......... *H04L 67/2847* (2013.01); *G06F 21/10* (2013.01); *G06F 21/6218* (2013.01);
(Continued)

(58) Field of Classification Search
None
See application file for complete search history.

(56) References Cited

U.S. PATENT DOCUMENTS

| 8,578,042 B2* | 11/2013 | Hu | .......... H04N 7/165 709/203 |
| 2003/0061370 A1* | 3/2003 | Nakayama | .............. H04L 29/06 709/231 |

(Continued)

FOREIGN PATENT DOCUMENTS

| JP | 2004048782 A | 2/2004 |
| KR | 2004-0047095 A | 6/2004 |

(Continued)

OTHER PUBLICATIONS

Japanese Office Action dated Oct. 1, 2019 issued in corresponding Japanese Patent Application No. 2016-135560.

*Primary Examiner* — Jeffery L Williams
(74) *Attorney, Agent, or Firm* — Harness, Dickey & Pierce, P.L.C.

(57) ABSTRACT

A content streaming service method for reducing communication cost and a system therefore are provided. The method includes receiving, by an electronic device, a file of content in a streaming scheme from a server through a network, and reproducing the content through an application driven in the electronic device, storing, by the electronic device, the received file in a local storage, generating, by the electronic device, a local server, the local server configured to operate in association with a memory of the electronic device, retrieving, by the electronic device, the file stored in the local storage according to the streaming scheme through the local server, and re-reproducing the content through the application.

14 Claims, 7 Drawing Sheets

(51) Int. Cl.
*G06F 21/10* (2013.01)
*G06F 21/62* (2013.01)

(52) U.S. Cl.
CPC ...... *H04L 63/0807* (2013.01); *H04L 65/4069* (2013.01); *H04L 65/602* (2013.01); *H04L 2463/121* (2013.01)

(56) References Cited

U.S. PATENT DOCUMENTS

| | | | | | |
|---|---|---|---|---|---|
| 2004/0267952 | A1* | 12/2004 | He | ................... | H04L 29/06027 709/231 |
| 2006/0095792 | A1* | 5/2006 | Hurtado | ................. | G06F 21/10 713/189 |
| 2010/0299443 | A1* | 11/2010 | Hu | ........................ | H04N 7/165 709/231 |
| 2012/0284370 | A1* | 11/2012 | Hierro | ................ | H04L 43/0894 709/219 |
| 2013/0218942 | A1* | 8/2013 | Willis | ................ | H04L 65/1069 709/201 |
| 2013/0332543 | A1 | 12/2013 | Shin et al. | | |
| 2014/0019540 | A1 | 1/2014 | Shin et al. | | |
| 2014/0222967 | A1* | 8/2014 | Harrang | .................. | H04L 67/10 709/219 |
| 2015/0007224 | A1* | 1/2015 | Cazoulat | .............. | H04N 21/482 725/37 |
| 2015/0113101 | A1* | 4/2015 | Kim | ........................ | G06F 16/24 709/219 |
| 2015/0195256 | A1* | 7/2015 | Swaminathan | ....... | H04L 9/0819 713/171 |
| 2015/0381677 | A1* | 12/2015 | Swenson | ........... | H04L 29/06027 709/219 |
| 2016/0021165 | A1* | 1/2016 | Panwar | ................. | H04L 65/607 709/231 |
| 2017/0013034 | A1* | 1/2017 | Chung | ............... | H04L 65/4084 |

FOREIGN PATENT DOCUMENTS

| | | |
|---|---|---|
| KR | 2008-0041982 A | 5/2008 |
| KR | 2011-0100534 A | 9/2011 |
| KR | 2012-0010164 A | 2/2012 |
| WO | WO-2015/065001 A1 | 5/2015 |

* cited by examiner

CONTENT STREAMING SERVICE METHOD FOR REDUCING COMMUNICATION COST AND SYSTEM THEREFOR

CROSS-REFERENCE TO RELATED APPLICATIONS

A claim for priority under 35 U.S.C. § 119 is made to Korean Patent Application No. 10-2015-0097945 filed Jul. 9, 2015, in the Korean Intellectual Property Office, the entire contents of which are hereby incorporated by reference.

BACKGROUND

Example embodiments of the inventive concepts described herein relate to content streaming service methods for reducing communication cost and/or systems therefor.

A streaming scheme has become more and more used as a scheme of reproducing sound sources, videos, animations, and the like in real time through the Internet. To perform a streaming operation, a client receives and collects data, and successively sends the data to an application program which converts the data into, for example, sounds or images. If the speed at which the client receives data is too fast, the client may need to store some data in its buffer for simultaneously streaming of the data.

In such streaming scheme, the same content is received (i.e., streamed through the Internet) whenever the content is reproduced, regardless of whether or not the content was previously streamed. For example, after data for content A are received and reproduced, if the content A is desired to be re-reproduced, the same data is re-received (i.e., re-streamed through the Internet). Therefore, content may be produced only in an online state and the same data is re-received (i.e., re-streamed through the Internet) again whenever the content is reproduced, thus increasing communication cost (e.g., data usage or traffic).

SUMMARY

Some example embodiments of the inventive concepts provide a content streaming service method (and a system therefor) for allowing the local server to re-reproduce content without re-receiving (re-streaming through the Internet) the same data and without changing a format of content, which have been saved in a previous streaming, Some example embodiments of the inventive concepts provide a content streaming service method (and a system therefor) for allowing the local server to re-reproduce content stored in a local file offline in the streaming scheme by storing, in a prior streaming, the content in the local file, and allowing the client to generate the local server and to directly stream the content.

Some example embodiments of the inventive concepts provide a content streaming service method (and a system therefor) for protecting content stored in a local file by storing the local file in an encryption scheme and allowing the local server generated in the client to decrypt the encrypted local file and to stream data.

One aspect of example embodiments of the inventive concepts is directed to provide a content streaming service method. The method may include receiving, by an electronic device, a file of content in a streaming scheme from a server through a network, and reproducing the content through an application driven in the electronic device, storing, by the electronic device, the received file in a local storage, generating, by the electronic device, a local server, the local server configured to operate in association with a memory of the electronic device, retrieving, by the electronic device, the file stored in the local storage according to the streaming scheme through the local server, and re-reproducing the content through the application.

The generating may include generating, when the local server is driven, a service port of the local server for a communication session. The retrieving may include changing a request address to an address of the local server, retrieving the file of the content stored in the local storage through the generated service port, if the file is stored in the local storage.

The retrieving may include requesting, if the file requested by the request address is not present in the local storage, the server to provide a streaming service for the requested content through the network.

The storing may include mapping and managing a path for the file of the content stored in the local with a unique address of the content. The retrieving may include reading out, by the local server, the file of the content using the path mapped with the unique address of the content, and providing, by the local server, the file of the content to the application according to the streaming scheme.

The storing may include encrypting the file of the content using an encryption key generated using at least two or more of information about the electronic device, information about a user of the electronic device, or information about the content, and storing the encrypted file of the content in the local storage. The retrieving may include decrypting, by the local server, the encrypted file of the content using the encryption key generated using the at least two or more information, and providing, by the local server, the decrypted file of the content to the application in the streaming scheme.

The method may further include issuing a one-time authentication token to the application in response to a request for the file of the content stored in the local storage. The retrieving and re-reproducing may include sending, by the application, a streaming request including the one-time authentication token to the local server and verifying, by the local server, validity of the one-time authentication token and providing, by the local server, the file of the content stored in the local storage to the application according to the streaming scheme if the one-time authentication token is valid.

The one-time authentication token may include a timestamp value for setting an expiration date or time of the one-time authentication token. In such case, the retrieving may further include verifying, by the local server, validity of the one-time authentication token based on the expiration date or time.

Another aspect of example embodiments of the inventive concepts is directed to provide a system for content streaming. The system may include a memory storing computer-readable instructions, and one or more processors configured to execute the computer-readable instructions such that the one or more processors are configured to control an electronic device to receive a file of content in a streaming scheme from a server through a network and to reproduce the content through an application driven in the electronic device, control the electronic device to store the received file of the content in a local storage, control the electronic device to generate a local server, the local server configured to operate in association with a memory of the electronic device, control the electronic device to retrieve the file of the content stored in the local storage in the streaming scheme through the local server, and re-reproduce the content through the application

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION

Example embodiments will be described in detail with reference to the accompanying drawings. The inventive concepts, however, may be embodied in various different forms, and should not be construed as being limited only to the illustrated example embodiments. Rather, these example embodiments are provided as examples so that this disclosure will be thorough and complete, and will fully convey the inventive concepts to those skilled in the art. Accordingly, known processes, elements, and techniques are not described with respect to some of the example embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular example embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Thus, for example, both "at least one of (or one of) A, B, or C" and "A, B, and/or C" means either A, B, C or any combination thereof. Also, the term "example" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and/or the present disclosure and will not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination hardware and software. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, a description will be given in detail for example embodiments of the inventive concepts with reference to the accompanying drawings. However, the inventive concepts are not limited by example embodiments. Also, with respect to the descriptions of the drawings, like reference numerals refer to like elements.

Figure 1:
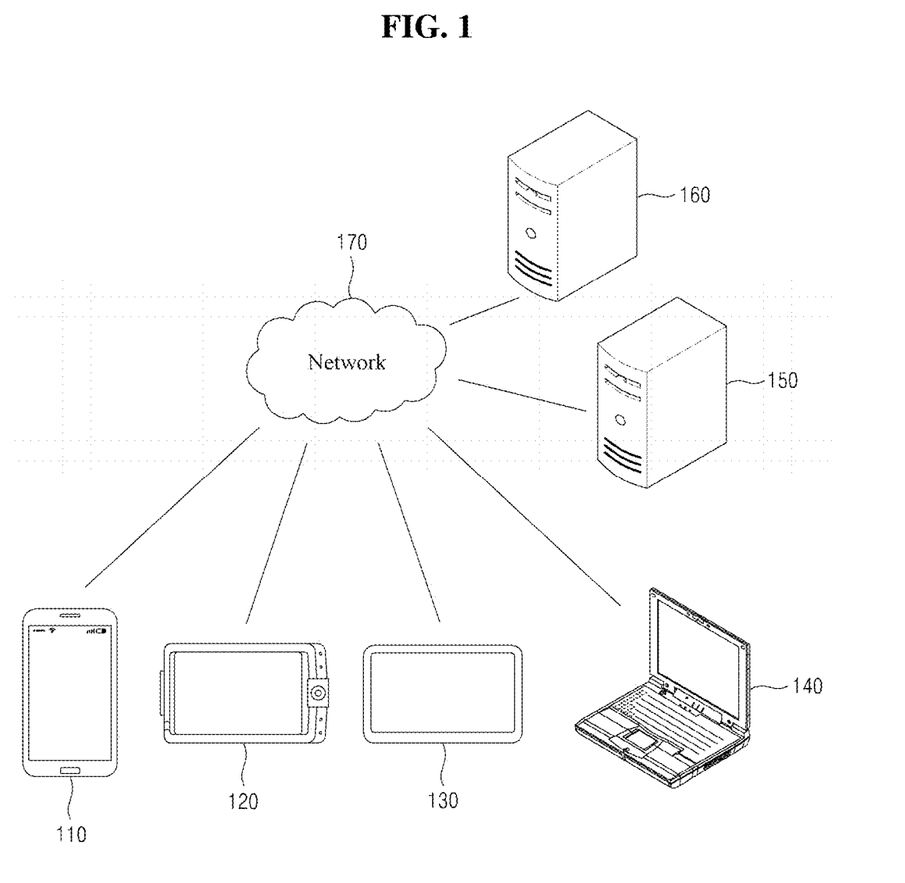
FIG. 1 is a drawing illustrating a network environment according to an example embodiment of the inventive concepts.

FIG. 1 is a drawing illustrating a network environment according to an example embodiment of the inventive concepts. As illustrated, the network environment of FIG. 1 may include a plurality of electronic devices 110 to 140, a plurality of servers 150 and 160, and a network 170. However, the number of electronic devices and the number of servers may not be limited thereto.

Each of the electronic devices 110 to 140 may be a fixed (e.g., immobile) terminal or a mobile terminal implemented with a computer system. For example, the plurality of electronic devices 110 to 140 may be a smart phone, a mobile phone, a navigation device, a computer, a notebook, a digital broadcasting terminal, a personal digital assistant (PDA), a portable multimedia player (PMP), a tablet personal computer (PC), and the like. For example, the electronic device 110 may communicate with the other electronic devices 120 to 140 and/or the servers 150 and 160 through the network 170 using a wired and/or wireless communication scheme.

The scope and sprit of the inventive concepts may not be limited to a specific communication scheme. For example, a communication scheme using a local area wireless communication network between devices as well as a communication scheme using a communication network (e.g., a mobile communication network, a wired internet, a wireless internet, and a broadcasting network) may be included in the network 170. For example, the network 170 may include one or more of networks, such as a personal area network (PAN), a local area network (LAN), a campus area network (CAN), a metropolitan area network (MAN), a wide area network (WAN), a broadband network (BBN), and the Internet. Also, the network 170 may include, but is limited to, one or more of network topologies which include a bus network, a star network, a ring network, a mesh network, a star-bus network, a tree or hierarchical network, and the like.

Each of the servers 150 and 160 may be implemented with a device or a plurality of devices which communicate with the plurality of electronic devices 110 to 140 through the network 170 to provide content for a service to the plurality of electronic devices 110 to 140.

For one example, the server 150 may provide to the electronic device 110 a code for configuring a screen of the electronic device 110 based on a request message of a user of the electronic device 110. In this case, the electronic device 110 may provide content to the user by configuring and displaying its screen using the provided code under control of an operating system (OS) and at least one program (e.g., a browser or a specific application) included in the electronic device 110.

For another example, the server 150 may send data for a streaming service to the electronic device 110 through the network 170. In this case, the electronic device 110 may reproduce and output content using data streamed under control of the OS and the at least one program included in the electronic device 110.

For another example, the server 150 may establish a communication session between the electronic device 110 and the electronic device 120, which access the server 150. In this case, the electronic devices 110 and 120 may receive a service, such as a chat service, a data transmit service, or a voice or video call service between the electronic devices 110 and 120, using the established communication session.

In another example embodiment, the plurality of electronic devices 110 to 140 may communicate with each other without intervention of the plurality of servers 150 and 160.

Figure 2:
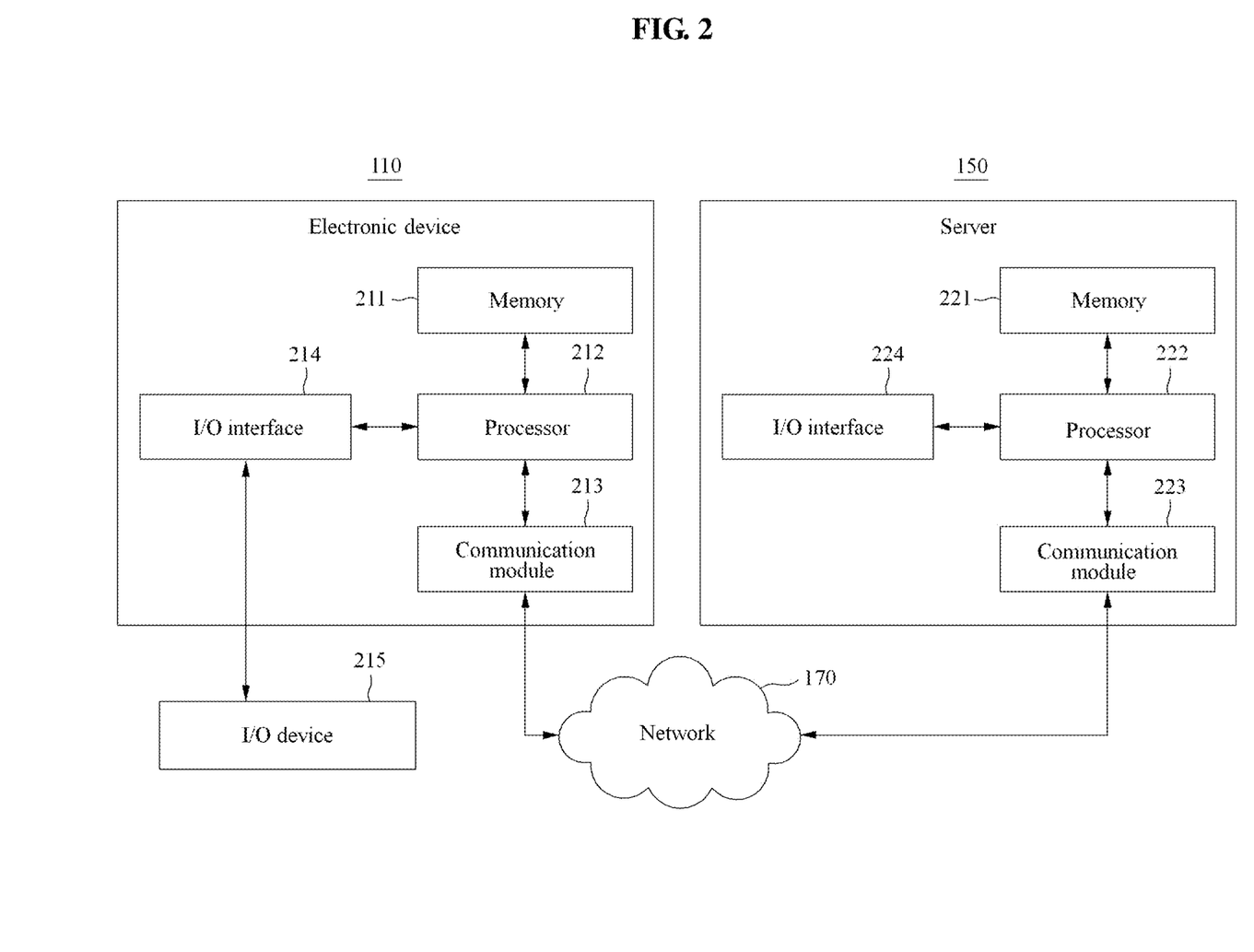
FIG. 2 is a block diagram illustrating a configuration of an electronic device and a configuration of a server in an example embodiment of the inventive concepts.

FIG. 2 is a block diagram illustrating a configuration of an electronic device and a configuration of a server in an example embodiment of the inventive concepts. In FIG. 2, an example embodiment is exemplified as one electronic device is an electronic device 110 of FIG. 1 and one server is a server 150 of FIG. 1.

The electronic device 110 may include a memory 211, a processor 212, a communication module 213, and an input and output interface 214. The server 150 may include a memory 221, a processor 222, a communication module 223, and an input and output interface 224. Each of the memories 211 and 221 may be a computer-readable recording medium and may include a permanent mass storage device such as a random access memory (RAM), a read only memory (ROM), and a disc drive. Also, each of the memories 211 and 221 may store an OS and/or at least one program code (e.g., a code for a browser or a specific application installed and driven in the electronic device 110). These software components may be loaded from a computer-readable recording medium, which is independent of the memories 211 and 221, using a drive mechanism. This computer-readable recording medium may include computer-readable recording media such as a floppy drive, a disc, a tape, a digital versatile disc/compact disc-ROM (DVD/CD-ROM) drive, and a memory card. In another example embodiment, software components may be loaded into the memories 211 and 221 through the communication modules 213 and 223, respectively, rather than a computer-readable recording medium. For example, at least one program may be loaded into each of the memories 211 and 221 based on a program installed by files provided through the network 170 by developers.

Each of the processors 212 and 222 may be configured to process an instruction of a computer program by performing basic arithmetic, logic, and input and/or output operations. The instruction may be provided to the processor 212 by the memory 211 or the communication module 213. The instruction may be provided to the processor 222 by the memory 221 or the communication module 223. For example, each of the processor 212 and 222 may be configured to execute an instruction received based on a program code stored in a storage device such as the memories 211 and 221.

Each of the communication modules 213 and 223 may provide a function such that the electronic device 110 and the server 150 communicate with each other through the network 170. Each of the communication modules 213 and 223 included in another electronic device 120 and another server 160 may provide a function such that the electronic device 120 of FIG. 1 and the server 160 of FIG. 1 communicates with each other through the network 170. For example, a request (e.g., a streaming service request for content) generated by the processor 212 of the electronic device 110 based on a program code stored in a recording device such as the memory 211 may be transmitted to the server 150 through the network 170 under control of the communication module 213. For example, a control signal or instruction, content, content, a file, and the like to be provided under control of the processor 222 of the server 150 may be received in the electronic device 110 through the communication module 213 of the electronic device 110, through the communication module 223 and the network 170. For example, the control signal or instruction of the server 150, received through the communication module 213, may be sent to the processor 212 and/or the memory 211. The content or file of the server 150 may be stored in a storage medium which may be further included in the electronic device 110.

The input and output interface 214 may interface with the input and output device 215. For one example, the input device may include a device such as a mouse or a keyboard. The output device may include a display for displaying a communication session of an application. For another example, the input and output interface 214 may interface with a device, such as a touch screen, in which an input function and an output function are integrated into one. For example, in processing an instruction of a computer program loaded into the memory 211, the processor 212 of the electronic device 110 may display a service screen and/or content, which is configured using data provided from the server 150 or the electronic device 120, on a display of the electronic device 110 through the input and output interface 214.

Also, in other example embodiments, the electronic device 110 may include more components than those shown in FIG. 2. The server 150 may include more components than those shown in FIG. 2. However, descriptions of such additional components are omitted for brevity. For example, the electronic device 110 may be implemented to include some of components of the above-mentioned input and output device 215 or may further include other components (e.g., a transceiver, a global positioning system (GPS) module, a camera, various sensors, and/or a database).

Figure 3:
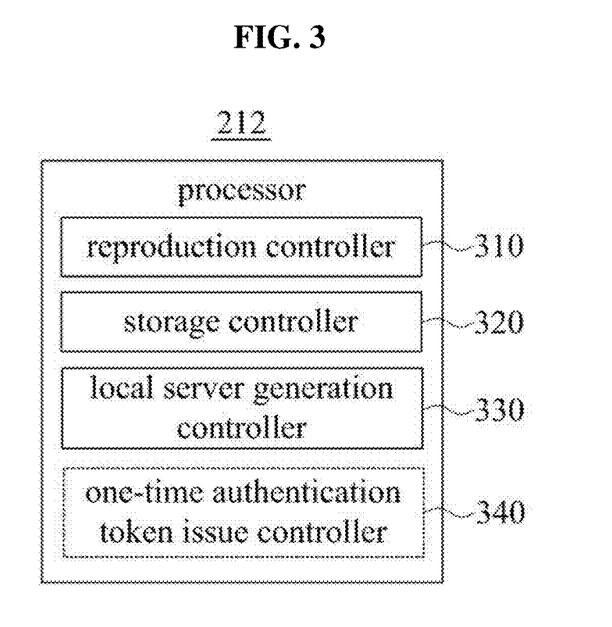
FIG. 3 is a block diagram illustrating a detailed configuration of a processor of an electronic device according to an example embodiment of the inventive concepts.
Figure 4:
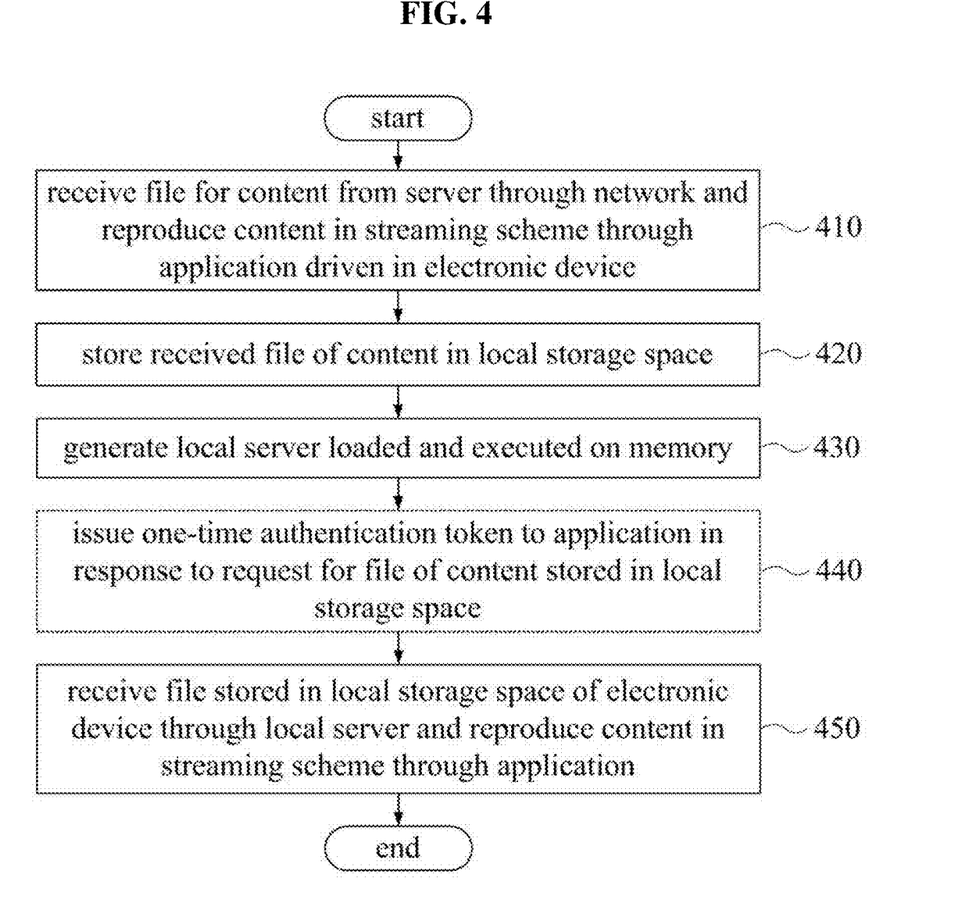
FIG. 4 is a flowchart illustrating a content streaming service method according to an example embodiment of the inventive concepts.

FIG. 3 is a block diagram illustrating a detailed configuration of a processor of an electronic device according to an example embodiment of the inventive concepts. FIG. 4 is a flowchart illustrating a content streaming service method according to an example embodiment of the inventive concepts. As shown in FIG. 3, a processor 212 of an electronic device 110 of FIG. 2 may include a reproduction controller 310, a storage controller 320, and a local server generation controller 330. The processor 212 may optionally further include a one-time authentication token issue controller 340 according to some example embodiments. These components of the processor 212 may control the electronic device 110 to perform steps 410 to 450 included in a content streaming service method of FIG. 4 and may be implemented to operate through, for example, an OS and/or at least one program code stored in a memory 211 of FIG. 2. Herein, step 440 may be optionally included in the content streaming service method according to some example embodiments. Further, these components of the processor 222 may not be separate components (e.g., separate controllers), but may be one or more processors configured to perform various function of the components.

In step 410, the electronic device 110 may receive a file for content in a streaming scheme from a server 150 of FIG. 2 through a network 170 of FIG. 2 and may reproduce the content through an application driven in the electronic device 110. The application may correspond to the at least program code described above. The reproduction controller 310 may control the electronic device 110 to reproduce the content in the streaming scheme. For example, the processor 212 of the electronic device 110 may control the electronic device 110 to receive the file of content according to instruction for the streaming scheme provided by the application from the server 150. The streaming scheme may be one of a well-known streaming protocol such as a real time streaming protocol (RTSP), a rapid transport protocol (RTP), etc.

In step 420, the electronic device 110 may store the received file of the content in a local storage space (or a local storage) (not shown). The local storage space may correspond to a separate computer-readable recording medium which may be further included in the electronic device 110. The storage controller 320 may control the electronic device 110 to store the file of the content in the local storage space.

In step 430, the electronic device 110 may generate a local server loaded and executed on the memory 211. In other words, the local server is configured to operate in association with the memory 211. The local server generation controller 330 may control the electronic device 110 to generate the local server through the application. This local server may be a virtual server generated by the electronic device 110. For example, the local server generation controller 330 may generate a service port of the local server for a communication session with the local server at a time when the local server is driven. The application may communicate data with the local server through this service port. The local server may be generated by the application. For example, the application may be configured to provide an instruction for generating the local server to the processor 212.

In step 440, the electronic device 110 may issue a one-time authentication token through the application in response to a request for the file of the content stored in the local storage space. The above-mentioned one-time authentication token issue controller 440 may control the electronic device 110 to issue the one-time authentication token.

In step 450, the electronic device 110 may receive the file stored in the local storage space of the electronic device 110 in the streaming scheme through the local server and may re-reproduce content through the application. For example, the application may request content based on an input of a user of the electronic device 110. In this case, if the content (or a file of the content) is stored in the local storage space, the application may receive the file of the content, stored in the local storage space, in the streaming scheme through the local server, rather than receiving the content again through a streaming server (e.g., the above-mentioned server 150), and may reproduce the content. The reproduction controller 310 may control the electronic device 110 to receive the file of the content through the local server and to re-reproduce the content through the application using the file of the content received from the local server. For example, the local server may include a function module for transmitting the file requested by a player installed in the electronic device 110 according to the streaming scheme to the player. The reproduction controller 310 may control the electronic device 110 to reproduce the file received according to the streaming scheme under control of the player.

In an example embodiment, in step 450, if the file of the requested content is stored in the local storage space, the electronic device 110 may change a request address to an address of the local server. In this case, the electronic device 110 may access the service port of the local server through the changed address. The application may receive a file stored in the local storage space in the streaming scheme from the local server through the service port and may reproduce content.

If the file of the requested content is not stored in the local storage space, the electronic device 110 may request the server 150 to provide a streaming service for the requested content through the network 170. In this case, according to a conventional streaming service, the electronic device 110 may receive the file of the content in the streaming scheme from the server 150 and may reproduce the content.

As such, since it is unnecessary to receive content (or a file of the content) stored in the local storage space again through the network 170, the electronic device 110 may reduce communication cost and may receive the content offline in the streaming scheme.

Also, in step 420, the electronic device 110 may map and manage a path for the file stored in the local storage space with a unique address of the content with respect to the file of the content stored in the local storage space. In this case, in step 450, the local server may read out the file of the content from the local storage space using the path mapped with the unique address of the content and may provide the file of the content to the application offline in the streaming scheme.

Also, files may be stored in the local storage space in an encryption scheme to protect the files of the content stored in the local storage space. For example, in step 420, the electronic device 110 may encrypt the file of the content using an encryption key and may store the encrypted file in the local storage space. In this case, the encryption key may be generated using information about the electronic device 110, information about a user of the electronic device 110, and/or information about the content. The encryption key may not be generated using information about another electronic device, information about a user of the other electronic device, or information about another content. In this case, the local server may decrypt a file of content encrypted using the encryption key generated using the information about the electronic device 110, the information about the user of the electronic device 110, and/or the information about the content using the same method as a method of generating the encryption key used to encrypt the file of the content. The application may receive the decrypted file and may reproduce the content offline in the streaming scheme.

Also, the one-time authentication token issued in step 440 may be used. For example, in step 450, the application may send a streaming request including the one-time authentication token to the local server. In this case, the local server may verify the validity of the one-time authentication token and may determine whether to provide or not a file of content stored in the local storage space. Also, the one-time authentication token may include a timestamp value for setting, for example, an expiration date or time of the one-time authentication token. In this case, the local server may further verify the validity of a period of time of the one-time authentication token based on the expiration date using the timestamp value. In other words, although the file of the content is stored in the local storage space, the content may be reproduced only within a period of time (meaning only when a valid one-time authentication token is issued).

According to some example embodiment, a system for content streaming may include a memory storing computer-readable instructions, and one or more processors configured to execute the computer-readable instructions such that the one or more processors are configured to control an electronic device to receive a file of content in a streaming scheme from a server through a network and to reproduce the content through an application driven in the electronic device, control the electronic device to store the received file of the content in a local storage, control the electronic device to generate a local server, the local server configured to operate in association with a memory of the electronic device, and control the electronic device to retrieve the file stored in the local storage in the streaming scheme through the local server and re-reproduce the content through the application.

Figure 5:
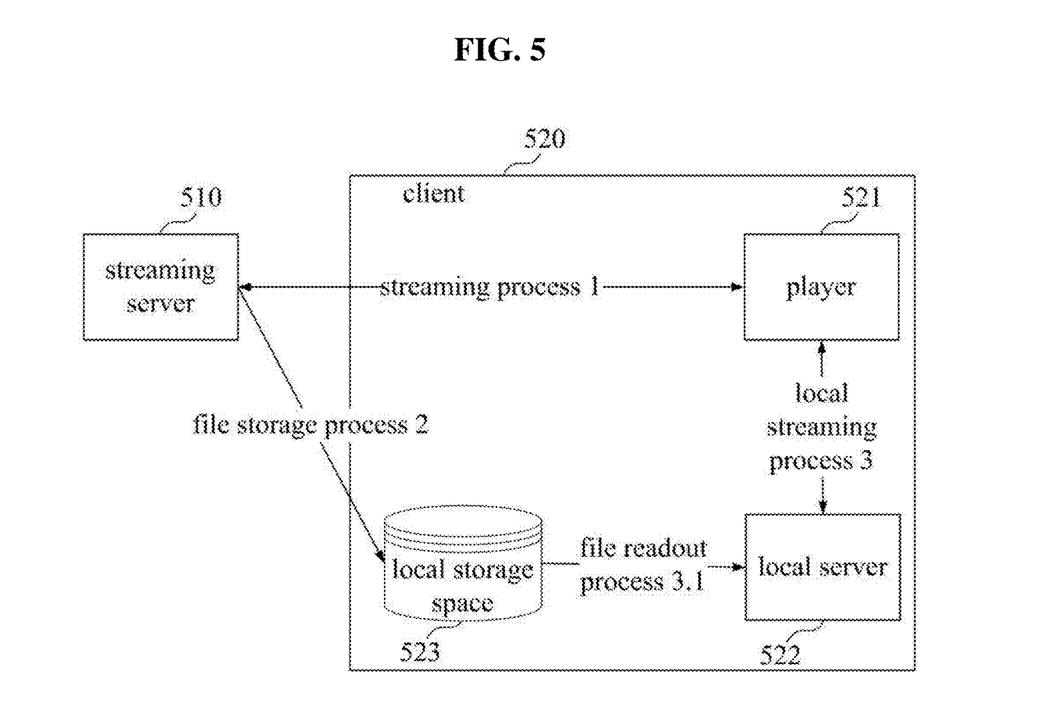
FIG. 5 is a drawing illustrating a process of reproducing content using a local server in an example embodiment of the inventive concepts.

FIG. 5 is a drawing illustrating a process of reproducing content using a local server in an example embodiment of the inventive concepts. FIG. 5 illustrates a streaming server 510 corresponding to a server 150 of FIG. 2 and a client 520 corresponding to an electronic device 110 of FIG. 2. The client 520 may include a player 521, a local server 522, and a local storage space 523. A streaming process 1 may be a process where the player 521 of the client 520 reproduces content using files of the content provided in a streaming scheme through a network (e.g., a network 170 of FIG. 2) from the streaming server 510. In this case, the player 521 may correspond to an application. A file storage process 2 may be a process where the client 520 stores files of content provided from the streaming server 510 in the local storage space 523.

Figure 6:
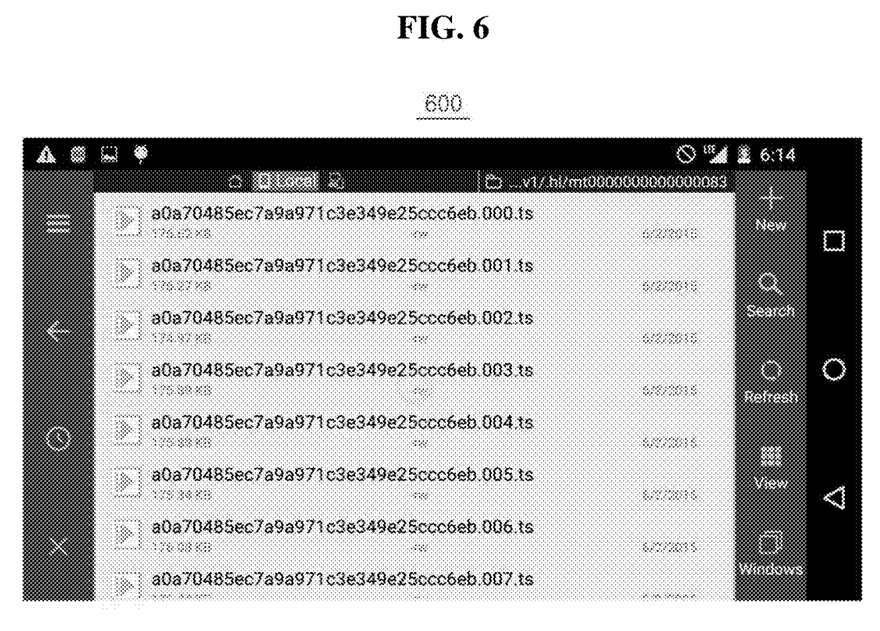
FIG. 6 is a drawing illustrating a screen of an electronic device, which displays files of content stored in a local storage space of the electronic device, in an example embodiment of the inventive concepts.
Figure 7:
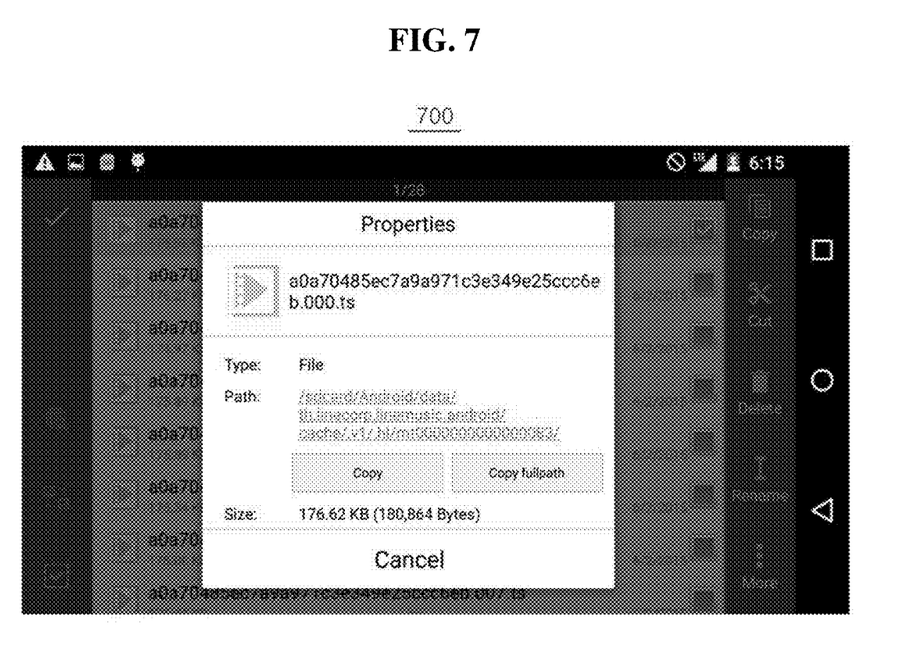
FIG. 7 is a drawing illustrating properties of a stored file in an example embodiment of the inventive concepts.

FIG. 6 is a drawing illustrating a screen of an electronic device, which displays files of content stored in a local storage space of the electronic device, in an example embodiment of the inventive concepts. FIG. 7 is a drawing illustrating properties of a stored file in an example embodiment of the inventive concepts.

FIG. 6 illustrates that a screen 600 displays files (e.g., files having an extension 'ts') of a format for streaming sound content. For example, a streaming server 510 of FIG. 5 may sequentially send files of the extension 'ts' of content, which is requested through a network to a client 520 of FIG. 5. A player 521 of FIG. 5 may sequentially reproduce the received 'ts' files to reproduce sound content in a streaming scheme. In this case, the client 520 may store the 'ts' files in a local storage space 523 of FIG. 5. The screen 600 may display the 'ts' files stored in the local storage space 523. In this case, the files may be stored not to be exposed immediately through hiding properties. Also, the files may be encrypted in various ways, and the encrypted files may be stored in the local storage space 523.

A path indicating a storage position may be generated to search for the stored 'ts' files through a path (e.g., a path stored in the local storage space 523), which does not include path information associated with a host. For example, the term 'path' on a screen 700 of FIG. 7 indicates an example of a path indicating this storage position.

The generated path may be mapped with a unique address (e.g., https://music-th-dn.line-apps-beta.com/hls/c4/c4859117daadof2118db82745d7de34x/cad678247fb207de5d1ffaab 4b574f1a.m3u8) of content. If there is a path of the local storage space 523 is mapped with an address of a requested content, the path may mean that the file of the corresponding content is stored in the local storage space 523.

Referring again to FIG. 5, a local streaming process 3 may be a process of providing a streaming service to the player 521 through the local server 522. If a file of content requested by the player 521 is stored in the local storage space 523, the stored file of the content may be streamed through the local serer 522 rather than the streaming server 510. The player 521 may request the local server 522 to send content together with an issued one-time authentication token. In this case, the local server 522 may check the validity of a received one-time authentication token. If the received one-time authentication token is valid, the local server 522 may decrypt encrypted files and may provide the decrypted files to the player 521.

A file readout process 3.1 may be a process where the local server 511 reads out a file to be streamed from the local storage space 523. The local server 522 may read out a file of the requested content from the local storage space 523 using a path mapped to an address of the requested content.

Also, any port (e.g., 127.0.0.1:1234) which may not be known in the outside may be generated at a time when the local server 522 is driven. The address for the requested content may be changed to a port (e.g., https://127.0.0.1:

1234/hls/c4/c4859117daadof2118db82745d7de34x/cad678247fb207de5d1ffaab4b574f1a. m3u8) of the local server 522.

Therefore, the player 521 may access a port of the local server 522 based on the changed address, may receive files provided from the local server 522, and may reproduce content offline in a streaming scheme. Because there are no network delay and the like involved to transfer a file between the player 521 and the local server 522, the file transfer between the player 521 and the local server 522 may be performed to be faster than a file transfer between the streaming server 510 and the client 520.

As such, according to example embodiments of the inventive concepts, the content streaming service system may store content in a local file. The client may generate a local server and may directly stream the content. Therefore, the local server may reproduce the content without the necessity of receiving the same data gain and without changing a format of content being streamed. The local server may reproduce the content stored in the local file offline in the streaming scheme. Also, the content streaming service system may store a local file in an encryption scheme. The local server generated in the client may decrypt the encrypted local file and may stream data, thus protecting content stored in the local file.

The foregoing devices may be realized by hardware elements, software elements and/or combinations thereof. For example, the devices and components illustrated in the example embodiments of the inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concepts may be implemented with program instructions which may be executed through various computer means and may be recorded in computer-readable media. The media may also include, alone or in combination with the program instructions, data files, data structures, and the like. The program instructions recorded in the media may be designed and configured specially for the example embodiments of the inventive concepts or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described example embodiments of the inventive concepts, or vice versa.

While a few example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

According to an example embodiment, the content streaming service system may allow the local server to reproduce content without the necessary of receiving the same data again and without changing a format of content being streamed and to reproduce content stored in a local file offline in the streaming scheme by storing the content in the local file and allowing the client to generate the local server and to directly stream the content.

According to an example embodiment, the content streaming service system may protect content stored in a local file by storing the local file in an encryption scheme and allowing the local server generated in the client to decrypt the encrypted local file and to stream data.

Therefore, other implements, other embodiments, and equivalents to claims are within the scope of the following claims.

What is claimed is:

1. A content streaming service method, the method comprising:
    receiving, by an electronic device, a file of content in a streaming scheme from a server through a network, and reproducing the content through an application driven in the electronic device;
    storing, by the electronic device, the received file in a local storage of the electronic device;
    generating, by the electronic device, a local server on the electronic device, the local server configured to operate in association with a memory of the electronic device;
    retrieving, by the electronic device, the file stored in the local storage according to the streaming scheme through the local server; and
    re-reproducing the content through the application,
    wherein the storing comprises,
        encrypting the file of the content using an encryption key generated using at least two or more of information about the electronic device, information about a user of the electronic device, or information about the content, and storing the encrypted file of the content in the local storage, and the retrieving comprises, decrypting, by the local server, the encrypted file of the content using the encryption key generated using the at least two or more of the information, and providing, by the local server, the decrypted file of the content to the application in the streaming scheme.

2. The method of claim 1, wherein:

the generating comprises generating, when the local server is driven, a service port of the local server for a communication session; and the retrieving comprises, changing a request address to an address of the local server, and retrieving the file of the content stored in the local storage through the generated service port, if the file is stored in the local storage.

3. The method of claim 2, wherein the retrieving comprises requesting, if the file requested by the request address is not present in the local storage, the server to provide a streaming service for the file of the content through the network.

4. The method of claim 1, wherein:

the storing comprises mapping and managing a path for the file of the content stored in the local storage with a unique address of the content; and the retrieving comprises, reading out, by the local server, the file of the content using the path mapped with the unique address of the content, and providing, by the local server, the file of the content to the application according to the streaming scheme.

5. The method of claim 1, further comprising:

issuing a one-time authentication token to the application in response to a request for the file of the content stored in the local storage, wherein the retrieving comprises, sending, by the application, a streaming request including the one-time authentication token to the local server, verifying, by the local server, validity of the one-time authentication token, and providing, by the local server, the file of the content stored in the local storage to the application according to the streaming scheme if the one-time authentication token is valid.

6. The method of claim 5, wherein when the one-time authentication token comprises a timestamp value for setting an expiration date or time of the one-time authentication token, the retrieving further comprises verifying, by the local server, validity of the one-time authentication token based on the expiration date or time.

7. A non-transitory computer-readable recording medium storing a computer program, which when executed by a computer, configured the computer to perform the method of claim 1.

8. A system for content streaming, the system comprising:

a memory configured to store computer-readable instructions; and one or more processors configured to execute the computer-readable instructions such that the one or more processors are configured to, control an electronic device to receive a file of content in a streaming scheme from a server through a network and to reproduce the content through an application driven in the electronic device, control the electronic device to store the received file of the content in a local storage therein, control the electronic device to generate a local server on the electronic device, the local server configured to operate in association with the memory of the electronic device, control the electronic device to retrieve the file of the content stored in the local storage according to the streaming scheme through the local server, and control the electronic device to re-reproduce the content through the application, wherein the one or more processors are further configured to control the electronic device to, encrypt the file of the content using an encryption key generated using at least two or more of information about the electronic device, information about a user of the electronic device, or information about the content, store the encrypted file of the content in the local storage, decrypt, by the local server, the encrypted file of the content using the encryption key, and provide the decrypted file of the content to the application in the streaming scheme.

9. The system of claim 8, wherein the one or more processors are further configured to, control, when the local server is driven, the electronic device to generate a service port of the local server for a communication session, control the electronic device to, change a request address to an address of the local server, retrieve the file of the content stored in the local storage through the generated service port, and re-reproduce, if the file of the content requested by the request address is present in the local storage, the content in the streaming scheme through the application.

10. The system of claim 8, wherein the one or more processors are further configured to control the electronic device to request, if the file of the content requested is not present in the local storage, the server to provide a streaming service for the file of the content through the network.

11. The system of claim 8, wherein the one or more processors are further configured to, control the electronic device to map and manage a path for the file of the content stored in the local storage with a unique address of the content, and control the electronic device such that the local server reads out the file of the content using the path mapped with the unique address of the content and provides the file of the content to the application according to the streaming scheme.

12. The system of claim 8, wherein the one or more processors are further configured to control the electronic device to, issue a one-time authentication token to the application in response to a request for the file of the content stored in the local storage, send, by the application, a streaming request including the one-time authentication token to the local server, verify, by the local server, validity of the one-time authentication token, and provide, by the local server, the file of the content stored in the local storage to the application in the streaming scheme if the one-time authentication token is valid.

13. The system of claim 12, wherein when the one-time authentication token comprises a timestamp value for setting an expiration date or time of the one-time authentication token, the one or more processors are further configured to verify validity of the one-time authentication token based on the expiration date or time.

14. A content streaming service method, the method comprising:

receiving, by an electronic device, a file of content in a streaming scheme from a server through a network, and reproducing the content through an application driven in the electronic device;

storing, by the electronic device, the received file in a local storage of the electronic device;

generating, by the electronic device, a local server on the electronic device, the local server configured to operate in association with a memory of the electronic device;

retrieving, by the electronic device, the file stored in the local storage according to the streaming scheme through the local server;

re-reproducing the content through the application; and issuing a one-time authentication token to the application in response to a request for the file of the content stored in the local storage, wherein the retrieving comprises,     sending, by the application, a streaming request including the one-time authentication token to the local server,     verifying, by the local server, validity of the one-time authentication token, and     providing, by the local server, the file of the content stored in the local storage to the application according to the streaming scheme if the one-time authentication token is valid.

\* \* \* \* \*